March 23, 1943. W. F. WARREN 2,314,470
FASTENER
Filed Jan. 27, 1942
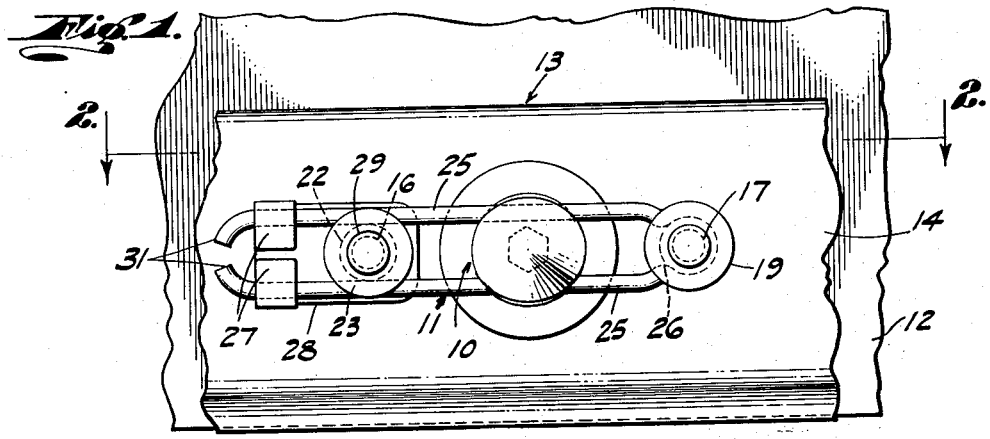
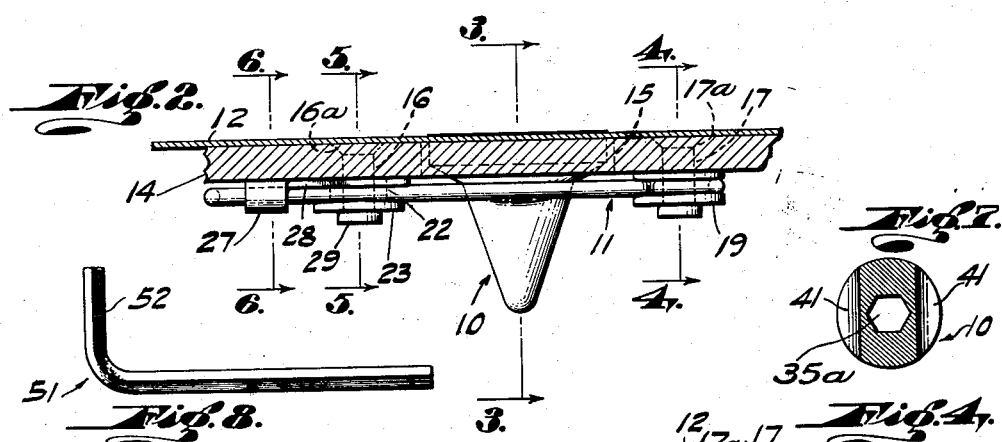
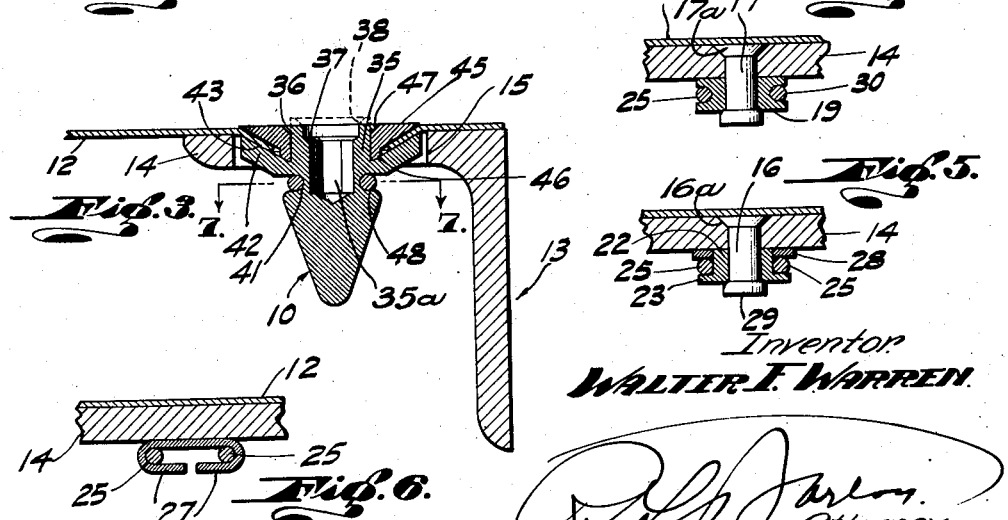
Inventor
WALTER F. WARREN
Attorney Patented Mar. 23, 1943

2,314,470

UNITED STATES PATENT OFFICE 2,314,470

FASTENER

Walter F. Warren, Hermosa Beach, Calif.

Application January 27, 1942, Serial No. 428,387

9 Claims. (Cl. 24—221)

The present invention relates to fasteners; in general to a snap fastener peculiarly adapted for fastening together associated members.

My new type of fastener is particularly valuable for use in the aircraft industry for fastening together the parts of aircraft cowlings, and other aircraft parts such as inspection doors and the like. However, there are many other specific uses to which the fastener can be advantageously put, one important example being in connection with metal boxes containing ammunition.

Fasteners now being most widely used in the aircraft industry are of the screw type rather than the snap type and necessitate the use of a tool to rotate them both at the time when the parts fastened together by them are being assembled as well as when they are disassembled.

The general object of the invention is to improve upon these screw type fasteners now being employed on the above class of work whereby the work in assemblying the associated members is much more simplified and effortless, and a fastener is produced which is less costly yet capable of producing the same functions in a more satisfactory manner.

One of the important objects of the invention is to provide a more sturdy, dependable fastener of the kind which may be automatically snapped in place by a mere push of the finger or pressure applied by the palm of the hand and automatically popped or snapped out of place by the application and fractional turn of a simple tool.

Another important object of the invention is to provide a fastener which may be assembled to the cowling or inspection doors of aircraft by riveting the protruding portion of one part of the fastener to its mating part requiring the use of no special tools, yet resulting in a much cleaner, smoother and neater exposed surface.

Another object of the invention is to provide a fastener wherein the yieldable member of the combination may be detached and a new one snapped into place, in the event of breakage or damage, without removal of any stationary parts to which it is attached.

Still another important object of the invention is to provide a fastener embodying a variable in the length of the mating parts capable of accommodating any variations in different thicknesses of the materials entering into the construction.

Yet still other objects of the invention are: to provide a fastener which will compensate for any movement or creep caused by heat from the motor in the different metals used, thereby preventing gaps or bulges between the "skins" and structural members, also any variations due to misalinement in the mating apertures of the parts to be joined; and to provide a fastener employing hole centers whereby it may be substituted for present fasteners without change in tooling or employment of auxiliary jigs.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed, without departing from the spirit of the invention.

Referring to the drawing wherein is shown a preferred embodiment of the invention as now reduced to practice:

Fig. 1 is a bottom plan view of the device as utilized for fastening a cover plate over an opening in an airplane construction, Fig. 2 is a cross section on line 2—2 of Fig. 1, parts being broken away to contract the view, Fig. 3 is a section on line 3—3 of Fig. 2, the part broken away in Fig. 2 being included in this view, Figs. 4, 5, 6 are fragmental sections taken respectively on lines 4—4, 5—5 and 6—6 of Fig. 2, Fig. 7 is a section on line 7—7 of Fig. 3 showing the bolt only, Fig. 8 is a side elevation of the tool which it is preferred to employ to detach the male fastening element.

Referring in detail to the drawing, the device includes a male member or head 10 capable of being releasably secured to a female element consisting of the spring member 11. Said head is turnably secured to a carrier member 12 which is shown as a plate and, for example, forms part of a cover or door which it is desired to secure to a stationary member 13 upon which the aforesaid spring member 11 is mounted.

Said member 13 is shown as being of an angle iron character and positioned with one of its flanges 14 extending horizontally. Said flange 14 will have through it at suitable intervals apertures 15, one of which is shown in the drawing, each of these apertures to accommodate a fastening device constructed according to the principles of the invention.

In adjacent, properly spaced relations to opposite sides of said aperture 15 countersunk holes 16a and 17a are made through said flange 14 into which are riveted the countersunk heads of rivets 16 and 17. The opposite end portions of said rivets project a considerable distance from the opposite face of the flange 14, preferably about half the length of the rivets in order that rivet 17 may carry a circumferentially grooved collar 19 at one side of the aperture 15 and that rivet 16 may carry a collar 22 at the opposite side of the aperture 15, said collar 22 being furnished with a flange 23 around its outer end.

By means of said rivets 16 and 17 and their collars 19 and 22 the limbs 25 of the hairpin-shaped spring comprising the female member 11 is secured to the flange 14 of the angle iron 13 in a parallel adjacent relation to that of the flange from which said rivets project, thus positioning each limb of the spring in an overlying adjacent, inwardly spaced relation to its side of the aperture 15. This spring is maintained securely in this position by reason of its looped end fitting around the circumferentially grooved collar 19 and having a contracted neck 26, see Fig. 1, which is sufficiently wide to permit the spring to be slipped astride the grooved part of the collar and forcibly moved until the collar engages its closed end, said neck then aiding in keeping the spring in place; the end portions of the limbs of the spring at the same time being passed astride the body portion of the aforementioned collar 22 and then inserted between the inturned, opposite ears 27 at one end of an elongated keeper plate 28, the body portion of the keeper plate having an aperture through it through which the rivet 16 extends. The head 29 of the rivet 16 maintains in place the keeper plate 28 and collar 22. In Fig. 1 the limbs 25 of the spring 11 are shown having end portions 31 deflected toward each other to facilitate their entrance between the ears 27.

Returning to the head or male member 10 of the fastener, said head has a hollow basal portion 35 which is internally polygonal to receive a suitable tool to turn the member 10. Said basal portion 35 alines axially with the approximately conical body portion of the member 10, said hollow portion terminating in an annular lip 36 which is reduced in thickness by reason of having a greater internal diameter than the remaining tubular part 35, the external diameter of the lip being the same. A definite internal annular shoulder 37 is thus provided within the hollow part 35. Said lip 36 is internally beveled at 38 thus facilitating outward peening thereof for the purpose later described.

Along diametrically opposite sides of the base of its frustoconical head the member 10 has two circumferentially extending recesses shaped as grooves 41 and between this grooved part and the aforesaid hollow part 35 the member 10 is concentrically surrounded by a frustoconical flange 42 which is directed away from the head proper and is formed as a unitary part thereof. In order to secure the member 10 to the carrier plate 12, said plate is provided with a countersunk portion 43 through the center of which is a round hole, and the inner face of the aforesaid flange 42 is abutted in a concentric manner against the outbent side of the countersunk portion of the metal. A frustoconical washer 45 is then abutted against the depressed side of the countersink as shown in Fig. 3 and around the hollow part 35. The lip 38 is then outwardly peened from the dotted line shape to the full line shape shown in Fig. 3, thus securely anchoring in place the male portion of the fastener. To make it perform its function more efficiently the washer 45 has at its inner side an annular shoulder 46 to accommodate the thickness of the countersunk portion 43 of the plate 12 so that the mounted male fastening element will be turnable. At its opposite side said washer has an internal bevel 47 to form a seat for the peened over lip 38.

As well seen in Figs. 2 and 3, that side of the frustoconical portion of the member 10 which adjoins each of the grooves 41 is beveled somewhat at 48, this facilitating the male member taking a cinching grip upon the limbs of the spring 11.

In Fig. 8 is shown an angular tool 51 having a polygonal stem 52 to fit within the polygonal recess 35a in the hollow shank 35 of the male fastener element in order to turn said element to bring its recesses or grooves into alinement with the limbs of the spring 25 preparatory to the insertion of said male element, and to turn the engaged male element through an angle sufficiently to release the limbs of the spring from said grooves, whereupon, owing to the taper of the male fastener, it snaps away from said spring.

In preparing the device for use, the plate 12 which carries the male element of the fastener is provided with a countersink which is centrally apertured to receive the hollow shank or base 35 of said fastener element, which is inserted from the outpressed side of the countersink thus bringing its surrounding flange 42 into contact with the outer side of the countersunk metal. Thereupon the washer 45 is applied, being positioned as shown in Fig. 3. Then, while a suitable support is applied to the lower end of the head of the fastener its lip 38 is outwardly peened over against the upper face of the washer 45. When the male element is manufactured the upper face of its flange 45 will be left high enough to fit snugly against a thin carrier plate, and this face will be machined away to the extent necessary to accommodate thicker plates.

The carrier for the female fastener element is shown having the collar 19 at one side of the aperture through it riveted on and, at the opposite side of the aperture through it have the collar 22 and keeper 28 riveted on before the spring 11 is put in place. Said spring (viewing the device as shown in Figs. 1 and 2 only supporting the male element not inserted) having the ends of its limbs sprung astride the grooved part of the collar 19, said spring then being moved leftward until its free ends are brought into an internal engagement with the keeper ears 27 and its neck portion 26 is caused to admit the collar 19 and then spring back to normal position at the left side of said collar. If the spring wears out or breaks it may be removed and a new one substituted without the necessity of removing any portion of the attaching means therefor.

In connecting the two carrier members to each other by means of the fastener, the two elements of the fastener may readily be snapped together without the use of a tool provided the oppositely disposed grooves or recesses of the male member aline with the parts of the limbs of the spring 11 which are positioned as chords in relation to the opening through the flange 14 of the carrier member 13. In such case the tapered head of the male member will be crowded in between said limbs until said limbs spring back into the recesses 41. It will always be necessary, however, in separating the fastening elements from each other, to insert the tool 51 into the hollow part of the male element and rotate said element through an angle sufficiently to bring its grooves out of engagement with the limbs of the spring, whereupon, owing to the taper of the male element, the spring will quickly force apart the fastener elements, together with their carrier members. Conversely, owing to the bevel 48 with which each grooved part of the male fastener is provided, as the spring enters each groove a wedging action will occur which will cause the two elements of the fastener to grip each other more tightly.

What is claimed is:

1. In a device of the kind described, the combination, with a pair of members to be attached to each other, each of said members having an aperture through it; of a hairpin like spring attached to one of said members in a parallel adjacent relation to a face of such member with its parallel limbs overlying opposite side portions of the aperture through such member; and a male fastening element fastened turnably within the aperture of the other of said pair of members, said male member having a base portion and a projecting tapered head united to said base portion, there being two diametrically opposite circumferentially extending grooves in said male member at the juncture of its said tapered head with its basal portion, said grooves occupying only opposite side portions of the member, said grooves being positioned and dimensioned each to have sprung into it one of the limbs of said spring when said tapered head is projected between said limbs, said male member having in the end thereof opposite to its tapered head a polygonal socket to receive a tool to turn it while in an inserted relation to the limbs of said spring, to a position wherein portions of its circumference between said grooves are brought into engagement with said limbs, thereby causing the disengagement of the two fastening elements.

2. In a device of the kind described, a carrier member having a plate portion provided with an aperture around which said plate is countersunk, a male fastening element having a body portion furnished with a peripheral flange which underlies the countersunk portion of the plate and with a tubular shank extending turnably through the aperture in the plate and into the recess formed by the countersink, a collar fitting around the end portion of said tubular shank, said collar having a beveled inner face contacting with the outer face of the countersink and said tubular shank being out-peened against said collar to prevent the withdrawal of said shank from said collar, said collar having a central annular spacing projection on its inner side to prevent the peening of said tubular shank from binding the parts of the fastener in a non-turnable relation to the aforesaid plate portion; and a hairpin like female fastening element to receive said male fastening element and be fastened thereto by turning of the latter.

3. The subject matter of claim 2 and, the aforesaid peripheral flange of the male member being of a frustoconical shape which conforms to the shape of the countersunk portion of the plate to which the male fastening element is attached.

4. In a device of the kind described, a carrier member comprising a plate portion provided with an aperture, a hairpin like female fastening spring attached to said plate portion in an adjacent parallel relation with its parallel limbs in inwardly spaced relations to opposite sides of said aperture, a circumferentially grooved collar into the groove of which is fitted the closed end portion of said spring, there being adjacent to that end of the spring, a contracted neck which prevents separation of the spring and collar, a rivet extending through said collar and securing it to said plate portion, means at the opposite side of said aperture slidably securing the free ends of the limbs of said spring to said plate portion; and a second carrier member furnished with a turnable male fastener having a tapered portion projectable between the limbs of said spring and having diametrically opposite recesses which, when said male fastener is forcibly inserted cause said limbs to spring into them, said male fastener being turnable to withdraw its recessed portions from said limbs.

5. In a device of the kind described, a carrier member having a plate portion provided with an aperture, a hairpin like female fastening spring attached to said plate portion in an adjacent parallel relation thereto with its parallel limbs in inwardly spaced relations to opposite sides of said aperture, a rivet extending through the loop of said hairpin like spring adjacent to its closed end, spacing means surrounding said rivet between it and the spring whereby the looped end portion of the spring is maintained in a slightly spaced relation to the plate portion to which it is attached, means at the opposite side of the aforesaid aperture to attach the free ends of the limbs of the spring to said plate portion in a like spaced relation to it; and a second carrier member furnished with a turnable male fastener having a tapered portion projectable between the limbs of said spring and having diametrically opposite recesses which receive the limbs of said spring when said male fastener is turned to the proper circumferential position and has its tapered portion forcibly inserted between said limbs, said male fastener being turnable to a position wherein its recessed portions are released from said limbs.

6. The subject matter of claim 5 and, the limbs of said spring being slidably related to their attaching means at one side of said aperture thereby facilitating the outbowing of the spring when the tapered male member is projected between them.

7. In a fastener of the kind described, a hairpin like female fastening element having spaced apart parallel yielding side portions, and a male fastening element furnished with a tapered head having diametrically opposite recesses into which said side portions spring when said head, in the proper circumferential position, is forced between them, a carrier plate for said head having an aperture through it, said tapered head having a tubular part which extends axially from its large end and which extends turnably through said aperture of said plate, said plate having a laterally deflected portion around its said aperture thereby forming a countersink in one of its faces and a frustoconical rise in its opposite face, said male element having a frustoconical flange leading from its aforesaid tubular part adjacent to its head, said flange underlying the outer side of the countersink and being inclined in conformity therewith, an attaching washer for said male element shaped to fill in the space within the countersink surrounding the inserted tubular shank, said washer having on one side an internal annular bevel which receives a peened over portion of the outer end portion of said tubular shank, said washer having around the opposite end of the opening through it an annular rib or shoulder of sufficient extent to slightly more than compensate for the thickness of the countersunk portion of the plate, whereby said male member is secured to the plate in a freely turnable manner.

8. In a fastener of the kind described, the combination, with a carrier member and a male fastening element mounted thereon and having a tapered head and locking shoulders at opposite sides of said head; of a second carrier member having an aperture to admit said head and carrying a female fastener in an adjacent, underlying relation to said aperture, said female fastener comprising a hairpin like spring, means whereby the closed end portion of said spring is secured to said second carrier member in an adjacent, parallel relation thereto, a spacing plate interposed between said second carrier member and the outer free end portions of the limbs of said spring, said plate having a pair of opposite ears inturned from its side edges and positioned to embrace loosely the limbs of said spring, thereby allowing a slight sliding movement of the embraced portions of said limbs when the limbs, where engaged by the male fastening element, are spread farther apart by said element.

9. In a fastener of the kind described, a hairpin shaped female fastening element having parallel spaced apart resilient side limbs with inturned ends, and a turnable male fastening element furnished with a tapered head having diametrically opposed recesses into which said limbs spring when said head, in the proper circumferential position is forced between them, the recessed portions of said head each being beveled at the side thereof which is directed toward the narrow part of the taper to cause the entrance of said resilient limbs into the recesses to urge the fastening elements toward each other, a carrier member for said male element, and a carrier element for said female element.

WALTER F. WARREN.